US010260633B2

(12) United States Patent
Yoshino

(10) Patent No.: US 10,260,633 B2
(45) Date of Patent: Apr. 16, 2019

(54) SEALING DEVICE

(71) Applicant: Eagle Industry Co., Ltd., Tokyo (JP)

(72) Inventor: Akira Yoshino, Tokyo (JP)

(73) Assignee: EAGLE INDUSTRY CO., LTD., Tokyo (JP)

(*) Notice: Subject to any disclaimer, the term of this patent is extended or adjusted under 35 U.S.C. 154(b) by 93 days.

(21) Appl. No.: 15/325,867

(22) PCT Filed: Jun. 25, 2015

(86) PCT No.: PCT/JP2015/068299
§ 371 (c)(1),
(2) Date: Jan. 12, 2017

(87) PCT Pub. No.: WO2016/009803
PCT Pub. Date: Jan. 21, 2016

(65) Prior Publication Data
US 2017/0175898 A1 Jun. 22, 2017

(30) Foreign Application Priority Data
Jul. 17, 2014 (JP) .................. 2014-146540

(51) Int. Cl.
*F16J 15/3232* (2016.01)
*F16J 15/3216* (2016.01)
*F16J 15/322* (2016.01)
*F16J 15/3256* (2016.01)
(Continued)

(52) U.S. Cl.
CPC ......... *F16J 15/3232* (2013.01); *F16J 15/322* (2013.01); *F16J 15/3216* (2013.01);
(Continued)

(58) Field of Classification Search
CPC .... F16J 15/3232; F16J 15/3216; F16J 15/322; F16J 15/3256
(Continued)

(56) References Cited

U.S. PATENT DOCUMENTS 5,921,555 A * 7/1999 Johnston ............... F16J 15/3228
277/549
8,256,772 B2 * 9/2012 Itadani .................. F16J 15/322
277/353
(Continued)

FOREIGN PATENT DOCUMENTS

CN 101842622 A 9/2010
FR 2087867 A5 12/1971
(Continued)

OTHER PUBLICATIONS

Extended European Search Report dated Mar. 3, 2018 (corresponding to EP15821724.0).
(Continued)

*Primary Examiner* — Nathan Cumar
(74) *Attorney, Agent, or Firm* — Harness, Dickey & Pierce, P.L.C.

(57) ABSTRACT

A sealing device which can stably exhibit a sealing function and enables a reduction in the number of components as well as in a radial size of the device. The sealing device includes a metal cartridge case (110) having a case main body (111) and a first supporting portion (113), a resin sealing member (120), an elastic sealing member (130), and a metal fixing member (140). An outer diameter of a cylindrical portion (141) of the fixing member (140) is set to be equal to or smaller than an inner diameter of the case main body (111), and the cylindrical portion (141) and the case main body (111) are secured by welding. The resin sealing member (120) and the elastic sealing member (130) are fixed by being held in between the first supporting portion (113) and a second supporting portion (142) of the fixing member (140).

7 Claims, 4 Drawing Sheets

(51) Int. Cl.
*F16J 15/3228* (2016.01)
*F16J 15/3268* (2016.01)

(52) U.S. Cl.
CPC ....... *F16J 15/3228* (2013.01); *F16J 15/3256* (2013.01); *F16J 15/3268* (2013.01)

(58) Field of Classification Search
USPC ......................................................... 277/551
See application file for complete search history.

(56) References Cited

U.S. PATENT DOCUMENTS

| | | | |
|---|---|---|---|
| 2002/0003337 A1* | 1/2002 | Yamada | F16J 15/322 |
| | | | 277/559 |
| 2009/0206555 A1 | 8/2009 | Sanada | |
| 2011/0215536 A1 | 9/2011 | Itadani et al. | |
| 2012/0169015 A1* | 7/2012 | Oiyama | F16J 15/3228 |
| | | | 277/562 |
| 2013/0228978 A1 | 9/2013 | Nakazono et al. | |

FOREIGN PATENT DOCUMENTS

| | | |
|---|---|---|
| GB | 449634 A | 7/1936 |
| JP | S62-183168 U | 11/1987 |
| JP | 5037682 B2 | 10/2012 |
| WO | 2008/004303 A1 | 1/2008 |

OTHER PUBLICATIONS

Chinese Office Action dated Dec. 5, 2017 corresponding to Chinese Application No. 201580033693.7.

* cited by examiner

SEALING DEVICE

CROSS-REFERENCE TO RELATED APPLICATIONS

This application is a National Stage of International Application No. PCT/2015/068299, filed Jun. 25, 2015 (now WO 2016/009803A1), which claims priority to Japanese Application No. 2014-146540, filed Jul. 17, 2014. The entire disclosures of each of the above applications are incorporated herein by reference.

FIELD

The present disclosure relates to a sealing device that seals an annular gap between a housing and a shaft.

BACKGROUND

Sealing devices are used in car water pumps for preventing water leakage (see Patent Literature 1). A sealing device according to a conventional example will be described with reference to FIG. 7. FIG. 7 is a schematic cross-sectional view of the sealing device according to the conventional example. The illustrated sealing device 700 serves the function of sealing an annular gap between a shaft hole provided in a housing (not shown) and a rotating shaft (not shown) inserted through this shaft hole.

In the sealing device 700 according to this conventional example, a resin sealing member 720 and an elastic sealing member 730 made of rubber or the like are fixed to a cartridge case 710 so that they can be handled as one component. The cartridge case 710 includes a cylindrical case main body 711 fitted to an inner circumferential surface of the shaft hole, an outward flange 712 extending radially outward from one end portion of the case main body 711 on a sealed fluid side, and an inward flange 713 extending radially inward from an end portion of the case main body 711 opposite from the sealed fluid side. The resin sealing member 720 is firmly secured by being held in between a pair of first and second metal supporting members 740 and 750 that are fixedly fitted to each other. The elastic sealing member 730 includes an outer peripheral sealing portion 731 that seals an annular gap between the outer circumferential surface of the second supporting member 750 and the inner circumferential surface of the case main body 711, and a sealing lip portion 732 slidable on the outer circumferential surface of the rotating shaft.

With the resin sealing member 720 fixed by the first supporting member 740 and second supporting member 750, and the elastic sealing member 730 being mounted on the inner circumferential side of the case main body 711, an adapter 760 is press-fitted. Accordingly, the resin sealing member 720 and elastic sealing member 730 are fixedly set in position in the axial direction. The distal end of the inward flange 713 is press-joined so that the resin sealing member 720 and elastic sealing member 730 are fixedly set in position in the radial direction (see press-joined portion 714 in the drawing).

The adapter 760 is press-fitted, as mentioned above. Generally, it is difficult to achieve precise positioning of press-fitted members because of the high sliding resistance during the press-fitting. In the case with the sealing device 700 according to the conventional example shown in FIG. 7, however, the resin sealing member 720 is firmly secured by the first supporting member 740 and second supporting member 750, and the outer circumferential side of the second supporting member 750 is elastically pressed by the outer peripheral sealing portion 731 of the elastic sealing member 730. The resin sealing member 720 is therefore maintained in a stable attitude. Accordingly, the resin sealing member 720 fully exhibits its function. The sealing function on the outer circumferential side is also fully exhibited, since the annular gap between the outer circumferential surface of the second supporting member 750 and the inner circumferential surface of the case main body 711 is sealed by the outer peripheral sealing portion 731 of the elastic sealing member 730.

As described, the illustrated sealing device 700 fully exhibits its function as a sealing device even if the positioning precision of the adapter 760 is low. The shortcoming of this sealing device 700, however, is that the number of parts is large as it requires several components. Generally, with an increase in the number of parts, not only the cost increases, but also measurement errors tend to be large, so that stricter dimension control is necessary. Another shortcoming is that it is difficult to reduce the radial size because of the configuration in which the annular gap between the outer circumferential surface of the second supporting member 750 and the inner circumferential surface of the case main body 711 is sealed by the outer peripheral sealing portion 731 of the elastic sealing member 730. It may therefore be impractical to adopt the configuration of the above-described sealing device 700 if the annular gap between the housing and the shaft is small.

CITATION LIST

Patent Literature

Patent Literature 1: Japanese Patent No. 5037682

SUMMARY

Technical Problem

An object of the present disclosure is to provide a sealing device that can stably exhibit the sealing function and enables a reduction in the number of components as well as in the radial size.

Solution to Problem

The present disclosure adopts the following means to achieve the object noted above.

Specifically, a sealing device of the present disclosure is a sealing device for sealing an annular gap between a shaft hole provided in a housing and a shaft inserted through the shaft hole, the sealing device comprising: a metal cartridge case including a cylindrical case main body fitted to an inner circumferential surface of the shaft hole, and a first supporting portion extending radially inward from an end portion of the case main body on an opposite side to a sealed fluid side; a resin sealing member provided adjacent to the first supporting portion on the sealed fluid side and having a sealing portion that is slidable on an outer circumferential surface of the shaft; an elastic member provided adjacent to the resin sealing member on the sealed fluid side; and a metal fixing member including a cylindrical portion fixed to an inner circumferential surface of the case main body, and a second supporting portion extending radially inward from an end portion of the cylindrical portion on the opposite side to the sealed fluid side, wherein an outer diameter of the cylindrical portion is set to be equal to or smaller than an inner diameter of the case main body, and the cylindrical portion and the case main body are being secured by welding, and the resin sealing member and the elastic member are fixed by being held in between the first supporting portion and the second supporting portion.

In the present disclosure, an outer diameter of the cylindrical portion in the metal fixing member is set to be equal to or smaller than the inner diameter of the case main body, and a configuration is adopted in which the cylindrical portion and case main body are secured by welding. Accordingly, in comparison to the case where the fixing member is secured by press-fitting, the fixing member can be positioned more precisely. Therefore, a separate component dedicated for fixing the resin sealing member in position as was conventionally practiced (such as the first supporting member 740 and second supporting member 750 made of metal in the conventional example described above) is not required. Accordingly, the number of components can be reduced. Moreover, since the fixing member can be positioned more precisely, the attitude of the resin sealing member can be made stable. Thus the sealing function can be exhibited in a stable manner. Also, there is no need to dispose part of an elastic component (such as the outer peripheral sealing portion 731 of the elastic sealing member 730 in the conventional example described above) on the outer side of the outer circumferential surface of the resin sealing member, so that the sealing device can be reduced in the radial size.

Preferably, an annular space may be formed between an outer wall surface of a portion connecting the cylindrical portion and the second supporting portion of the fixing member, and the elastic member.

Accordingly, the heat generated during the welding is prevented from being conducted to the elastic member.

Preferably, the elastic member may include: an annular body portion provided between the resin sealing member and the second supporting portion and having an outer circumferential surface that is in close contact with the inner circumferential surface of the case main body; and a sealing lip portion provided integrally with the body portion and being slidable on the outer circumferential surface of the shaft.

Accordingly, the elastic member can provide a sealing between the inner circumferential surface of the case main body and the outer circumferential surface of the shaft. Also, as described above, since the positioning precision of the fixing member can be improved, the elastic member can be positioned more precisely, so that the attitude of the elastic member is made stable. Also, the body portion of the elastic member can make close contact with the inner circumferential surface of the case main body more precisely. Accordingly, the sealing function on the outer circumferential side is fully achieved without the need to dispose part of an elastic component (such as the outer peripheral sealing portion 731 of the elastic sealing member 730 in the conventional example described above) on the outer side of the outer circumferential surface of the resin sealing member.

Preferably, the fixing member may be fixed to the case main body at a position where a repulsive force from the elastic member applied on the second supporting portion is within a predetermined range.

Accordingly, the resin sealing member and elastic member can be fixed in position precisely.

Various configurations described above may be adopted in as many combinations as possible.

Advantageous Effects of the Disclosure

As described above, according to the present disclosure, the sealing device can stably exhibit the sealing function and enables a reduction in the number of components as well as in the radial size.

DRAWINGS

DETAILED DESCRIPTION

Hereinafter, modes for implementing the present disclosure will be exemplarily described in detail based on examples thereof with reference to the drawings. However, the dimensions, materials, shapes, relative arrangements and so on of constituent parts described in the examples are not intended to limit the scope of the present disclosure to these alone in particular unless specifically described.

APPLICATION EXAMPLES

Figure 1:
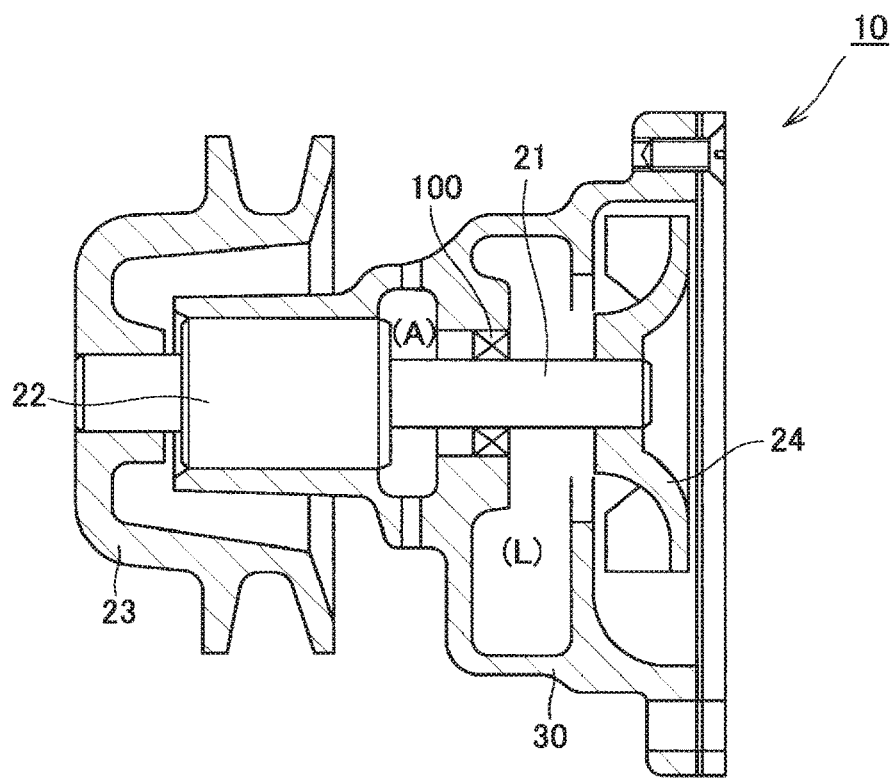
FIG. 1 is a schematic cross-sectional view of a water pump.

Application examples of the sealing device 100 according to an example of the present disclosure will be described with reference to FIG. 1. FIG. 1 is a schematic cross-sectional view of a car water pump 10. The water pump 10 includes a rotating shaft 21 and a housing 30 with a shaft hole for the rotating shaft 21 to pass through. A bearing 22 is attached to the rotating shaft 21 for smooth rotation of the rotating shaft 21. A pulley 23 is attached to one end side of the rotating shaft 21, to which a rotary drive force is imparted via a belt or the like (not shown), while an impeller 24 is attached to another end side to pump cooling water (LLC) under pressure. The sealing device 100 according to the present example is disposed in an annular gap between the rotating shaft 21 and the housing 30 in order to prevent this cooling water from leaking to the outside (i.e., the opposite side (A) to the sealed fluid side (L)). Namely, in the present example, the sealed fluid is cooling water. Note that the sealing device according to the present disclosure may be applied to other purposes.

Example 1

Figure 2:
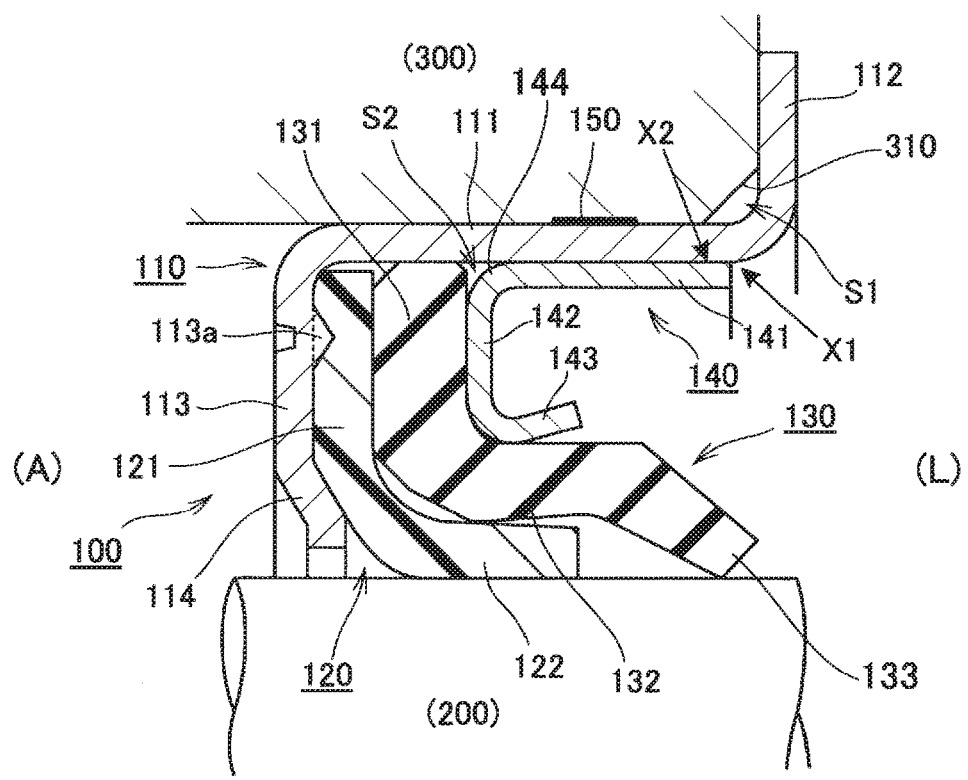
FIG. 2 is a schematic cross-sectional view of a sealing device according to Example 1 of the present disclosure.
Figure 3:
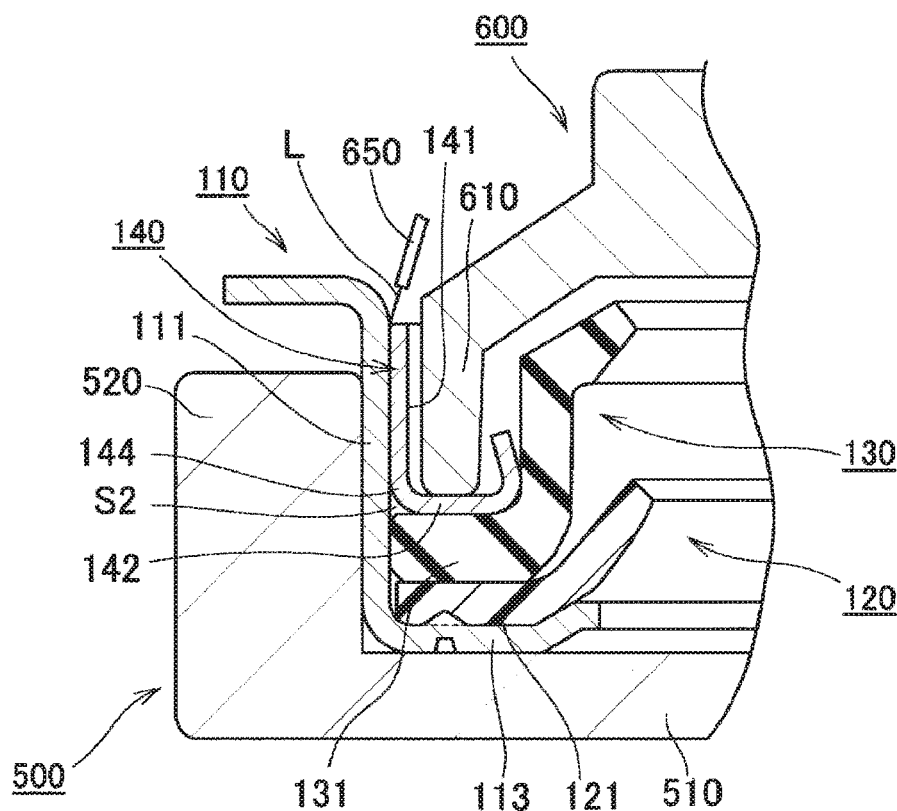
FIG. 3 is a diagram for explaining how the sealing device according to Example 1 of the present disclosure is assembled.

The sealing device 100 according to Example 1 of the present disclosure will be described with reference to FIG. 2 and FIG. 3. The sealing device 100 according to the present example serves the function of sealing an annular gap between a shaft hole provided in a housing 300 and a shaft 200 inserted through this shaft hole. When the sealing device 100 is applied to the car water pump 10 described above, the housing 300 corresponds to the above-mentioned housing 30, and the shaft 200 corresponds to the above-mentioned rotating shaft 21.

<Configuration of Sealing Device>

The sealing device 100 according to the present example will be described with reference particularly to FIG. 2. The sealing device 100 is configured such that a resin sealing member 120 and an elastic sealing member 130, which is an elastic member (made of an elastic material such as rubber), are fixed to a cartridge case 110 so that they can be handled as one component. This sealing device 100 is made up of these three parts, a metal fixing member 140 for fixing the resin sealing member 120 and the elastic sealing member 130 to the cartridge case 110, and an outer peripheral sealing member 150 provided on the outer circumference of the cartridge case 110.

The cartridge case 110 includes a cylindrical case main body 111, an outward flange 112 provided on the sealed fluid side (L) of the case main body 111, and a first supporting portion 113 provided on the opposite side (A) to the sealed fluid side (L) of the case main body 111, these being in one piece.

The case main body 111 is fixed to the inner circumferential surface of the shaft hole formed in the housing 300 by being fitted therewith. The outer peripheral sealing member 150, which is an elastic coating, is provided on the outer circumference of this case main body 111. The outer peripheral sealing member 150 ensures prevention of water leakage through between the sealing device 100 and the shaft hole in the housing 300. In the process of fixedly fitting the case main body 111 to the shaft hole formed in the housing 300, part of the outer peripheral sealing member 150 is scraped off. However, there is an annular space S1 formed by a chamfer 310 near the open edge of the shaft hole in the housing 300. Therefore, shavings of the outer peripheral sealing member 150 being scraped off are accumulated in this annular space S1. Accordingly, the possibility of shavings entering into the sealed fluid (L) is reduced.

The outward flange 112 is formed to extend radially outward from one end portion of the case main body 111 on the sealed fluid side (L). The cartridge case 110 is fitted to the shaft hole in the housing 300 until this outward flange 112 abuts on an end face of the housing 300, whereby the cartridge case 110 is set in position.

The first supporting portion 113 is formed to extend radially inward from one end portion of the case main body 111 on the opposite side (A) to the sealed fluid side (L). A distal end portion of this first supporting portion 113 is formed to incline toward the direction of the sealed fluid (L) so as to form a back-up portion 114 that supports the resin sealing member 120. The first supporting portion 113 further includes a plurality of circumferentially spaced protrusions 113a. These protrusions 113a are formed so as to bite into the resin sealing member 120. Accordingly, the possibility of the resin sealing member 120 coming off of the cartridge case 110 is reduced.

The resin sealing member 120 includes a body portion 121, and a sealing portion 122 extending from a radially inner side of the body portion 121 toward the direction of the sealed fluid (L), these being in one piece. The resin sealing member 120 is provided adjacent to the first supporting portion 113 on the sealed fluid side (L). The body portion 121 makes close contact with the first supporting portion 113, while the inner circumferential surface of the sealing portion 122 makes close contact with the outer circumferential surface of the shaft 200 so as to be slidable thereon. A portion between the body portion 121 and the sealing portion 122 that is bent in a curve is supported by the back-up portion 114. The resin sealing member 120 is a disc-like member with a hole in the center before being assembled to the cartridge case 110 (when not subjected to external forces). Having said that, the inner circumferential end portion of the resin sealing member 120, which will be the sealing portion 122, should preferably be bent in advance to some extent toward the direction of the sealed fluid (L) in order to facilitate insertion of the shaft 200.

The elastic sealing member 130 includes an annular body portion 131, a cylindrical portion 132 extending from a radially inner side of the body portion 131 toward the direction of the sealed fluid (L), and a sealing lip portion 133 inclined radially inward from the end portion of the cylindrical portion 132, these being in one piece. The elastic sealing member 130 is provided adjacent to the resin sealing member 120 on the sealed fluid side (L). The body portion 131 makes close contact with the body portion 121 of the resin sealing member 120 on the sealed fluid side (L), while the inner circumferential surface of the cylindrical portion 132 at least partially makes close contact with the outer circumferential surface of the sealing portion 122 of the resin sealing member 120. The sealing lip portion 133 makes close contact with the outer circumferential surface of the shaft 200 so as to be slidable thereon at a point further closer to the sealed fluid (L) than the distal end of the sealing portion 122 of the resin sealing member 120. The body portion 131 is provided between the body portion 121 of the resin sealing member 120 and a second supporting portion 142 of the fixing member 140 to be described later, and formed such that its outer circumferential surface makes close contact with the inner circumferential surface of the case main body 111.

The metal fixing member 140 is made up of a cylindrical portion 141, the second supporting portion 142 extending radially inward from an end portion on the opposite side (A) to the sealed fluid side (L) of the cylindrical portion 141, and a tapered portion 143 extending from the distal end of the second supporting portion 142 toward the direction of the sealed fluid (L) so as to increase in diameter. The cylindrical portion 141 is fixed to the inner circumferential surface of the case main body 111. The outer diameter of the cylindrical portion 141 is set to be equal to or smaller than the inner diameter of the case main body 111, and the cylindrical portion 141 and the case main body 111 are secured by welding. The cylindrical portion 141 may be welded at an end portion on the sealed fluid side (L) as indicated by arrow X1 in FIG. 2, or at an interface between the inner circumferential surface of the case main body 111 and the outer circumferential surface of the cylindrical portion 141 as indicated by arrow X2 in FIG. 2. In the case with the latter, however, the welding point should preferably be near the end portion of the cylindrical portion 141 on the sealed fluid side (L) so that the heat generated during the welding is conducted less to the elastic sealing member 130. The portion bent in a curve that connects the second supporting portion 142 and the tapered portion 143 provides a support for the outer circumferential surface of the cylindrical portion 132 of the elastic sealing member 130. Accordingly, the sealing lip portion 133 is prevented from separating from the outer circumferential surface of the shaft 200. The tip of the tapered portion 143 is separated from the outer circumferential surface of the cylindrical portion 132 of the elastic sealing member 130 so that it is unlikely to damage the cylindrical portion 132.

The resin sealing member 120 and the elastic sealing member 130 are fixed by being held in between the first supporting portion 113 of the cartridge case 110 and the second supporting portion 142 of the fixing member 140. An annular space S2 is formed between an outer wall surface of the portion 144 connecting the cylindrical portion 141 and the second supporting portion 142 of the fixing member 140, and the elastic sealing member 130.

<Assembling Procedure of the Sealing Device>

An assembling procedure of the sealing device 100 according to the present example will be described with reference particularly to FIG. 3. In the present example, when assembling the sealing device 100, a receiving jig 500 that provides a base, a pressing member 600, and a laser light source 650 are used. The receiving jig 500 includes a base portion 510 and a cylindrical portion 520. First, the cartridge case 110, to which the resin sealing member 120, elastic sealing member 130, and fixing member 140 have already been mounted, is assembled to this receiving jig 500. Since the outer diameter of the cylindrical portion 141 of the fixing member 140 is set to be equal to or smaller than the inner diameter of the case main body 111, the fixing member 140 can be mounted to the cartridge case 110 with hardly any pressure. The cylindrical portion 520 of the receiving jig 500 has an inner diameter slightly larger than the outer diameter of the case main body 111. Therefore, hardly any pressure is required when fitting the cartridge case 110 into the receiving jig 500.

Next, the second supporting portion 142 of the fixing member 140 is pressed toward the base portion 510 of the receiving jig 500 by the tip of a cylindrical pressing portion 610 provided on the pressing member 600. With the pressing member 600 kept in position where a pressure within a predetermined range is being loaded, a laser beam L is emitted from the laser light source 650 to weld the cylindrical portion 141 and the case main body 111 securely together. As mentioned above, since the outer diameter of the cylindrical portion 141 of the fixing member 140 is set to be equal to or smaller than the inner diameter of the case main body 111, there is hardly any friction between the cylindrical portion 141 and the case main body 111. Accordingly, the pressure applied by the pressing member 600 on the second supporting portion 142 of the fixing member 140 is equal to the repulsive force from the elastic sealing member 130 applied on the second supporting portion 142. Thus, through the welding described above, the fixing member 140 is fixed to the case main body 111 at a position where the repulsive force from the elastic sealing member 130 applied on the second supporting portion 142 is within a predetermined range.

Preferably, a load sensor may be provided to one of the receiving jig 500 and the pressing member 600, so that the movement of the pressing member 600 is stopped when the load detected by this load sensor falls within a predetermined range, to carry out the welding. With the laser light source 650 alone being fixed, the sealing device 100 may be rotated together with the receiving jig 500 and the pressing member 600 while the laser beam L is emitted, so that the sealing device can be welded all around. While the welding is performed with a laser beam L in the present example, various other known techniques (such as TIG welding) may be adopted for the welding. The welding may be performed all around as described above, or at several circumferentially spaced points.

<Advantages of the Sealing Device According to the Present Example>

As described above, in the sealing device 100 according to the present example, the outer diameter of the cylindrical portion 141 of the metal fixing member 140 is set to be equal to or smaller than the inner diameter of the case main body 111. In addition, a configuration is adopted in which the cylindrical portion 141 and the case main body 111 are secured by welding. Accordingly, in comparison to the case where the fixing member 140 is press-fitted, the positioning precision of the fixing member 140 can be improved. Therefore, a separate component dedicated for fixing the resin sealing member 120 in position as was conventionally practiced (such as the first supporting member 740 and second supporting member 750 made of metal in the conventional example described above) is not required. Accordingly, the number of components can be reduced. Since the fixing member 140 has the cylindrical portion 141, and this cylindrical portion 141 is secured to the case main body 111, the fixing member 140 is prevented from tilting in the axial direction relative to the case main body 111. Thus, the attitude of the fixing member 140 can be maintained stably. Assuming that the fixing member 140 has no cylindrical portion 141, the second supporting portion 142 could be fixedly welded to the case main body 111 at the outer peripheral edge thereof. In this case, however, there would be a concern that the second supporting portion 142 would tilt such that its radially inner side is oriented toward the direction of the sealed fluid (L), which would cause the attitudes of the resin sealing member 120 and elastic sealing member 130 unstable.

Since the positioning precision of the fixing member 140 can be improved, the attitude of the resin sealing member 120 can be made stable, so that the device can exhibit its sealing function in a stable manner. Also, there is no need to dispose part of an elastic component (such as the outer peripheral sealing portion 731 of the elastic sealing member 730 in the conventional example described above) on the outer side of the outer circumferential surface of the resin sealing member 120, so that the sealing device 100 can be reduced in the radial size.

The annular space S2 is formed between an outer wall surface of the portion 144 connecting the cylindrical portion 141 and the second supporting portion 142 of the fixing member 140, and the elastic sealing member 130. Therefore, the heat generated during the welding is prevented from being conducted to the elastic sealing member 130.

Furthermore, since the positioning precision of the fixing member 140 can be improved as described above, the elastic sealing member 130 can be positioned more precisely, so that the attitude of the elastic sealing member 130 is made stable. Also, the body portion 131 of the elastic sealing member 130 can make close contact with the inner circumferential surface of the case main body 111 more precisely. Accordingly, the sealing function on the outer circumferential side is fully achieved without the need to dispose part of an elastic component (such as the outer peripheral sealing portion 731 of the elastic sealing member 730 in the conventional example described above) on the outer side of the outer circumferential surface of the resin sealing member 120.

In addition, the fixing member 140 is fixed to the case main body 111 in a position where the repulsive force from the elastic sealing member 130 applied on the second supporting portion 142 is within a predetermined range. Accordingly, the resin sealing member 120 and elastic sealing member 130 can be fixed in position precisely.

Example 2

Figure 4:
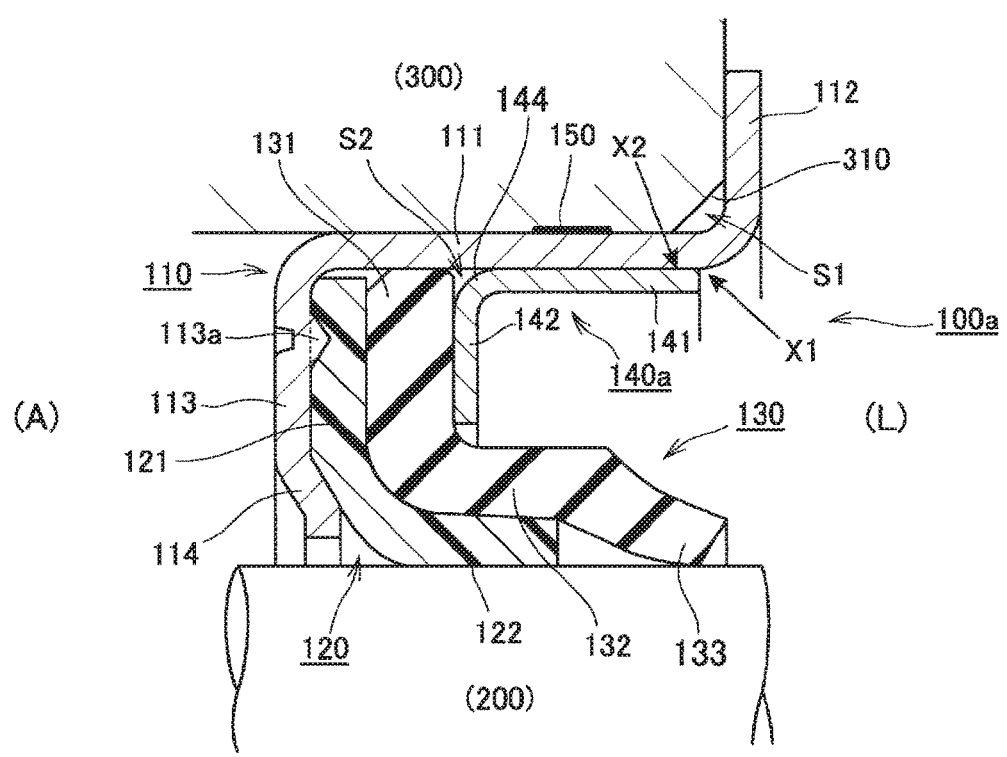
FIG. 4 is a schematic cross-sectional view of a sealing device according to Example 2 of the present disclosure.

FIG. 4 shows Example 2 of the present disclosure. In the present example, a fixing member with a different structure from that of Example 1 will be illustrated. Other features in the configuration and effect are the same as those of Example 1, and therefore the same constituent elements are given the same reference numerals and the descriptions thereof are omitted.

The fixing member 140 according to Example 1 described above is provided with the tapered portion 143 extending from the distal end of the second supporting portion 142 toward the direction of the sealed fluid (L) so as to increase in diameter. This tapered portion 143 is provided in order to prevent the sealing lip portion 133 from separating from the outer circumferential surface of the shaft 200, as mentioned above. Depending on the environment of use, however, there may not be a possibility that the sealing lip portion 133 separates from the outer circumferential surface of the shaft 200. The metal fixing member 140*a* according to the present example, therefore, is formed only by a cylindrical portion 141 and a second supporting portion 142 extending radially inward from an end portion of the cylindrical portion 141 on an opposite side (A) to the sealed fluid side (L). Thus the fixing member 140*a* according to the present example is not provided with the tapered portion 143 as in the fixing member 140 shown in Example 1.

Other features in the configuration of the fixing member 140*a* are the same as those of Example 1 described above, and therefore the descriptions thereof are omitted. It goes without saying that the same effects as those of the sealing device 100 according to Example 1 are achieved by the sealing device 100*a* according to the present example, too.

Example 3

Figure 5:
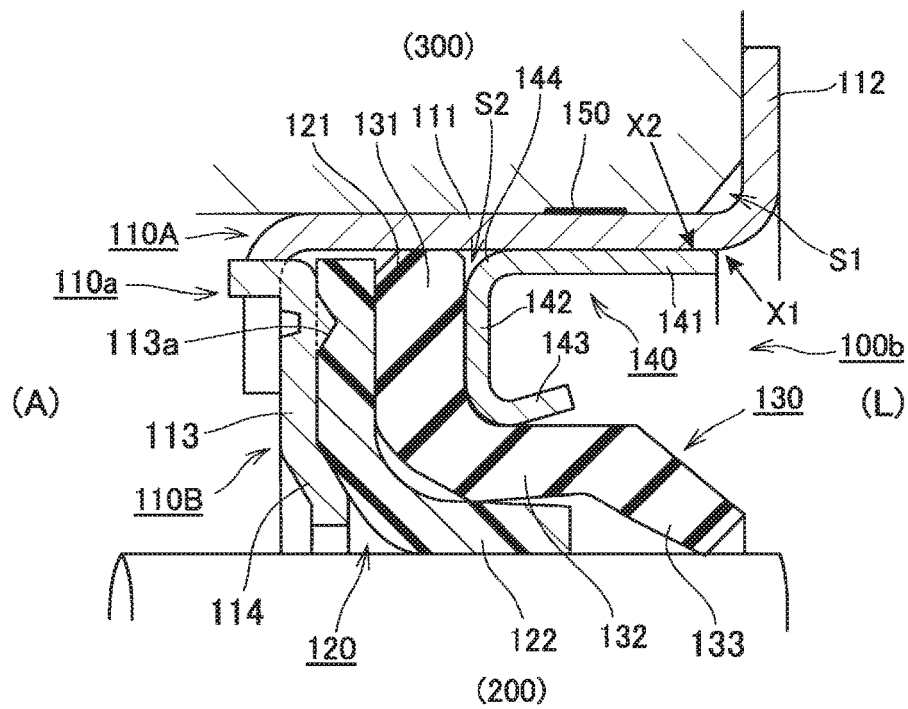
FIG. 5 is a schematic cross-sectional view of a sealing device according to Example 3 of the present disclosure.

FIG. 5 shows Example 3 of the present disclosure. While a configuration of the cartridge case made from one component was illustrated in the previously described Example 1, a configuration of the cartridge case made from two components will be illustrated in the present example. Other features in the configuration and effect are the same as those of Example 1, and therefore the same constituent elements are given the same reference numerals and the descriptions thereof are omitted.

The cartridge case 110*a* according to the present example is formed by a first cartridge case 110A and a second cartridge case 1108 fixedly attached to this first cartridge case 110A by press-fitting. The first cartridge case 110A includes a cylindrical case main body 111, and an outward flange 112 provided on the sealed fluid side (L) of the case main body 111, these being in one piece. The second cartridge case 1108 includes a first supporting portion 113 provided on the opposite side (A) to the sealed fluid side (L) of the case main body 111. Similarly to Example 1, the distal end portion of this first supporting portion 113 is formed to incline toward the direction of the sealed fluid (L) so as to form a back-up portion 114 that supports the resin sealing member 120. The roles and functions of the case main body 111, outward flange 112, first supporting portion 113, and back-up portion 114 are as have been described in Example 1.

Configurations other than those of the cartridge case 110*a* are the same as those of Example 1 described above, and therefore the descriptions thereof are omitted. It goes without saying that the same effects as those of the sealing device 100 according to Example 1 are achieved by the sealing device 100*b* according to the present example. The fixing member 140*a* illustrated in the previously described Example 2 may be adopted in the sealing device 100*b* according to the present example, as well.

Example 4

Figure 6:
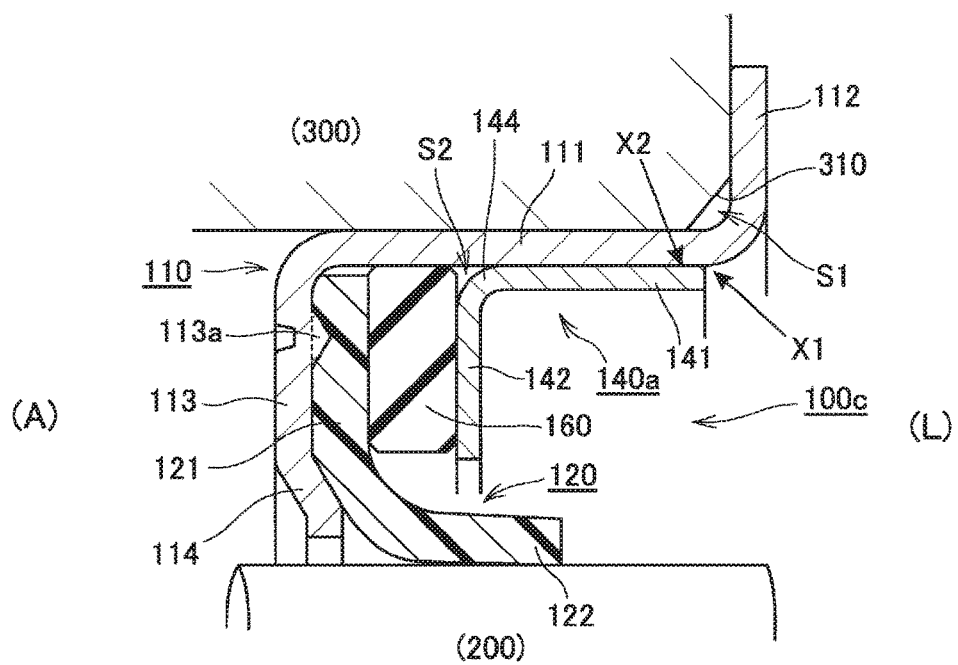
FIG. 6 is a schematic cross-sectional view of a sealing device according to Example 4 of the present disclosure.
Figure 7:
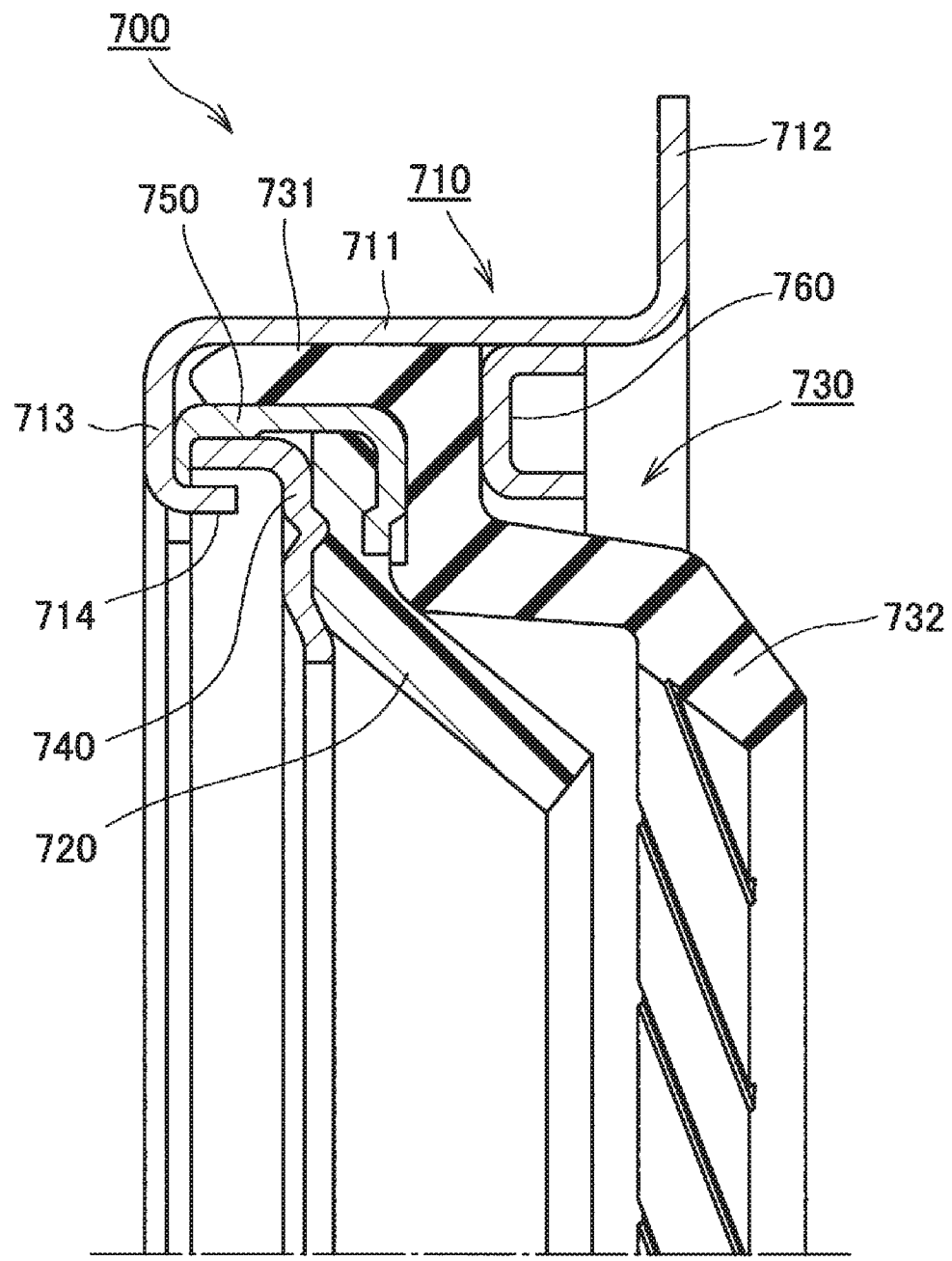
FIG. 7 is a schematic cross-sectional view of a sealing device according to a conventional example.

FIG. 6 shows Example 4 of the present disclosure. While one configuration in which the elastic member is an elastic sealing member was illustrated in the previously described Example 1, a configuration in which the elastic member does not have the sealing function will be illustrated in the present example. Other features in the configuration and effect are the same as those of Example 1, and therefore the same constituent elements are given the same reference numerals and the descriptions thereof are omitted.

The elastic member 160 according to the present example is formed only by a cylindrical portion. Namely, it is formed only by a portion corresponding to the body portion 131 of the elastic sealing member 130 shown in the previously described Examples. Since the elastic member 160 according to the present example does not include a sealing lip portion, it employs the fixing member 140*a* illustrated in Example 2.

Configurations other than those of the elastic member 160 are the same as those of Example 1 described above, and therefore the descriptions thereof are omitted. It goes without saying that the same effects as those of the sealing device 100 according to Example 1 are achieved by the sealing device 100*c* according to the present example, as well, except for the effects relating to the elastic sealing member 130.

(Others)

While a configuration was illustrated in various examples described above in which the first supporting portion 113 of the cartridge case 110 or 110*a* was provided with a back-up portion 114, the back-up portion 114 may not necessarily be provided depending on the environment of use, such as when there is no need to support the resin sealing member 120.

REFERENCE SIGNS LIST

10: Water pump
21: Rotating shaft
22: Bearing
23: Pulley
24: Impeller
30: Housing
100, 100*a*, 100*b*, 100*c*: Sealing device
110, 110*a*: Cartridge case
110A: First cartridge case
110B: Second cartridge case
111: Case main body
112: Outward flange
113: First supporting portion
113*a*: Protrusion
114: Back-up portion
120: Resin sealing member
121: Body portion
122: Sealing portion
130: Elastic sealing member
131: Body portion
132: Cylindrical portion
133: Sealing lip portion
140, 140*a*: Fixing member
141: Cylindrical portion
142: Supporting portion
143: Tapered portion 150: Outer peripheral sealing member
160: Elastic member
200: Shaft
300: Housing
500: Receiving jig
510: Base portion
520: Cylindrical portion
600: Pressing member
610: Pressing portion
650: Laser light source
L: Laser beam
S1, S2: Annular space

The invention claimed is:

1. A sealing device for sealing an annular gap between a shaft hole provided in a housing and a shaft inserted through the shaft hole, the sealing device comprising:
   a metal cartridge case including a cylindrical case main body fitted to an inner circumferential surface of the shaft hole, and a first supporting portion extending radially inward from an end portion of the case main body on an opposite side to a sealed fluid side;
   a resin sealing member provided adjacent to the first supporting portion on the sealed fluid side and having a sealing portion that is slidable on an outer circumferential surface of the shaft;
   an elastic member provided adjacent to the resin sealing member on the sealed fluid side; and
   a metal fixing member including a cylindrical portion fixed to an inner circumferential surface of the case main body, a second supporting portion extending radially inward from an end portion of the cylindrical portion on the opposite side to the sealed fluid side, and a tapered portion extending from the distal end of the second supporting portion toward the direction of the sealed fluid so as to increase in diameter, wherein
   an outer diameter of the cylindrical portion is set to be equal to or smaller than an inner diameter of the case main body, and the cylindrical portion and the case main body are being secured by welding,
   the resin sealing member and the elastic member are fixed by being held in between the first supporting portion and the second supporting portion,
   the elastic member further includes an annular body portion and a cylindrical portion extending from a radially inner side of the annular body portion toward the direction of the sealed fluid,
   the fixing member further includes a bent portion bent in a curve that connects the second supporting portion and the tapered portion, the bent portion supporting an outer circumferential surface of the cylindrical portion of the elastic member, and
   a tip of the tapered portion is separated from the outer circumferential surface of the cylindrical portion of the elastic member.

2. The sealing device according to claim 1, wherein an annular space is formed between an outer wall surface of a portion connecting the cylindrical portion and the second supporting portion of the fixing member, and the elastic member.

3. The sealing device according to claim 1, wherein
   the annular body portion of the elastic member is provided between the resin sealing member and the second supporting portion and has an outer circumferential surface that is in close contact with the inner circumferential surface of the case main body; and
   the elastic member further includes a sealing lip portion provided integrally with the body portion and being slidable on the outer circumferential surface of the shaft.

4. The sealing device according to claim 1, wherein the fixing member is fixed to the case main body at a position where a repulsive force from the elastic member applied on the second supporting portion is within a predetermined range.

5. The sealing device according to claim 2, wherein
   the annular body portion of the elastic member is provided between the resin sealing member and the second supporting portion and has an outer circumferential surface that is in close contact with the inner circumferential surface of the case main body; and
   the elastic member further includes a sealing lip portion provided integrally with the body portion and being slidable on the outer circumferential surface of the shaft.

6. The sealing device according to claim 2, wherein the fixing member is fixed to the case main body at a position where a repulsive force from the elastic member applied on the second supporting portion is within a predetermined range.

7. The sealing device according to claim 3, wherein the fixing member is fixed to the case main body at a position where a repulsive force from the elastic member applied on the second supporting portion is within a predetermined range.

* * * * *